Nov. 29, 1966  P. G. SARABER  3,288,550
MOTION PICTURE FILM PROJECTORS
Filed Dec. 2, 1963  7 Sheets-Sheet 1
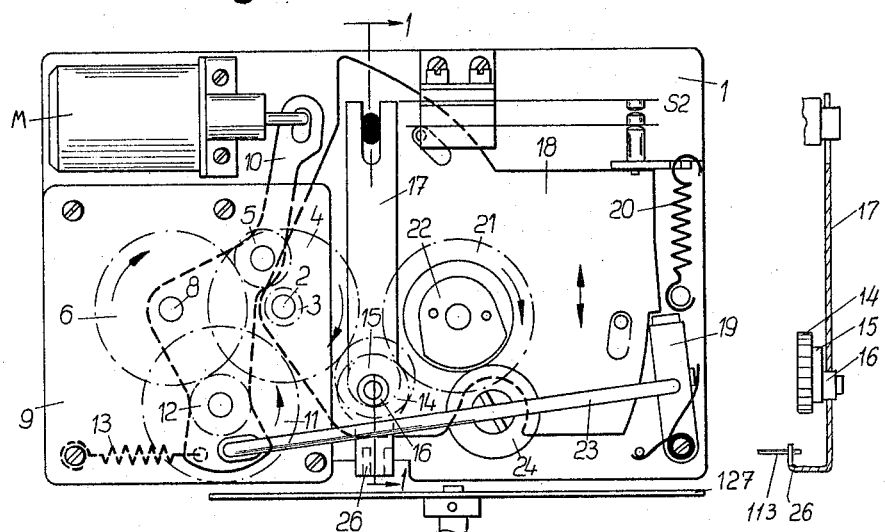
Fig. 1
Fig. 1A
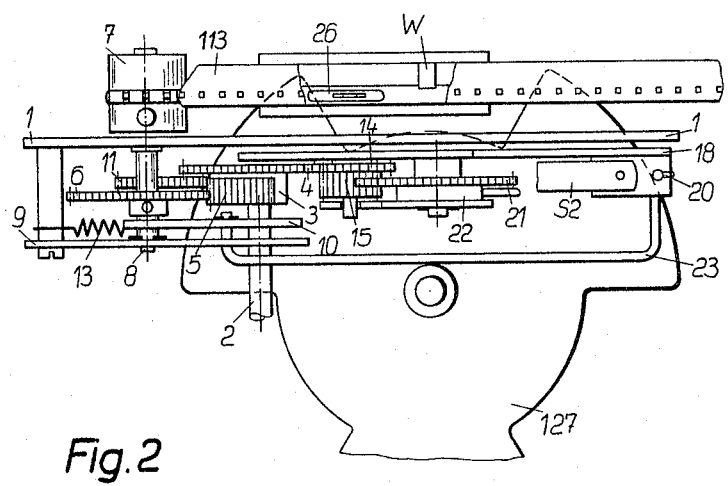
Fig. 2
Inventor
Petrus Gerardus Saraber
McGlew and Toren
attorneys

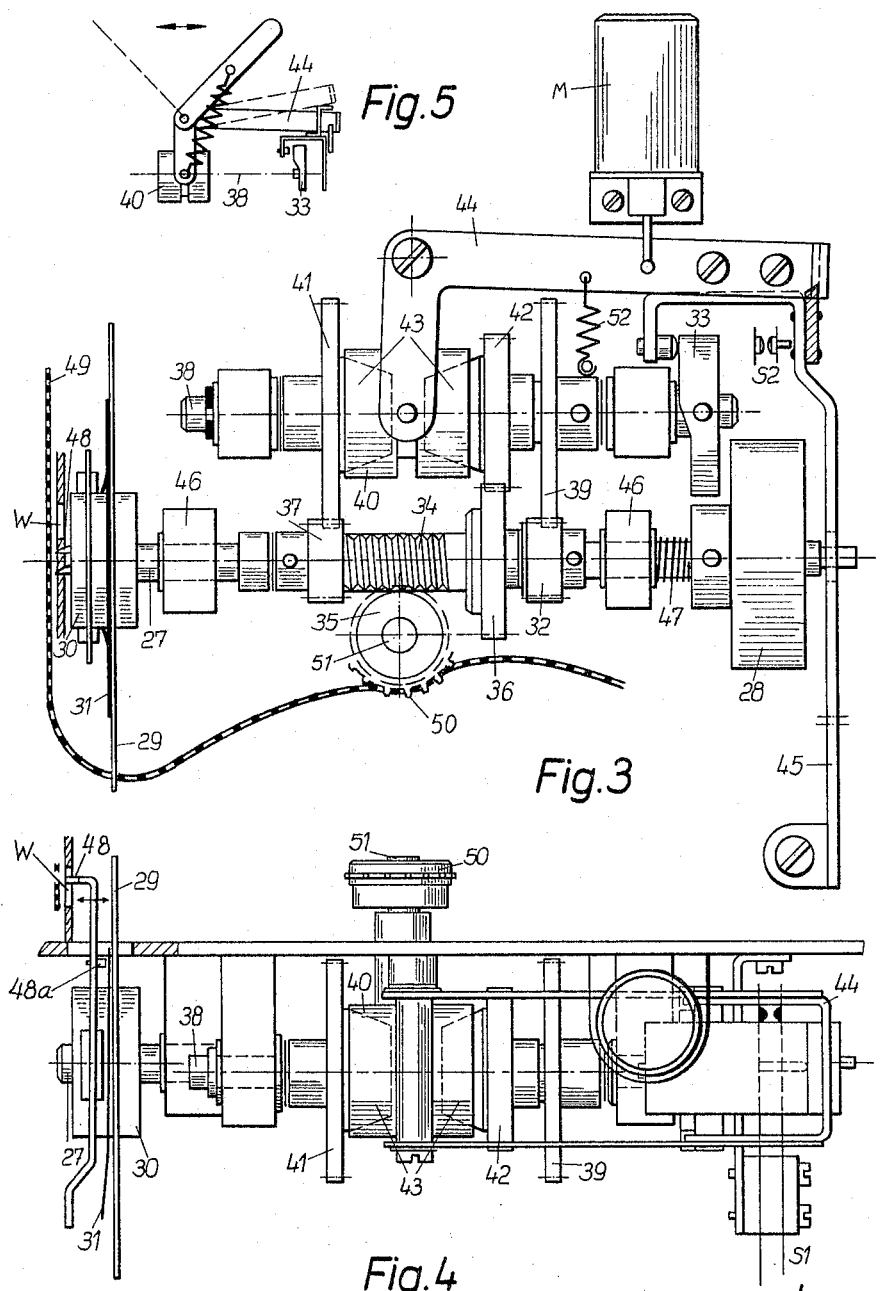

Nov. 29, 1966     P. G. SARABER     3,288,550
MOTION PICTURE FILM PROJECTORS
Filed Dec. 2, 1963     7 Sheets-Sheet 4

Inventor
Petrus Gerardus Saraber
McGlew and Toren
attorneys

Nov. 29, 1966   P. G. SARABER   3,288,550
MOTION PICTURE FILM PROJECTORS
Filed Dec. 2, 1963   7 Sheets-Sheet 7

Inventor
Petrus Gerardus Saraber
McGlew and Toren
Attorney

United States Patent Office 3,288,550
Patented Nov. 29, 1966

3,288,550
MOTION PICTURE FILM PROJECTORS
Petrus Gerardus Saraber, Wolfhalden, Switzerland, assignor to Contina Bureaux- und Rechenmaschinenfabrik, Aktiengesellschaft, Mauren, Liechtenstein
Filed Dec. 2, 1963, Ser. No. 327,217
Claims priority, application Switzerland, Nov. 30, 1962, 14,121/62; Sept. 6, 1963, 11,079/63
16 Claims. (Cl. 352—180)

This invention relates to motion picture projectors of the type which permit films taken at normal speeds to be projected in slow motion.

With projectors of this type adapted for use with narrow gauge film, it has been proposed to effect change-over from the normal operating speed of, say, 16 frames per second to, say, 5⅓ frames per second by reducing both the shutter speed and the frame sequence rate by the appropriate amount and at the same time transforming the usual three-bladed shutter into a nine-bladed shutter. It has also been proposed to equip these projectors with a nine-bladed shutter ab-initio, so as to permit the frame sequence rate to be arbitrarily reduced simply by reducing the speed of the driving motor.

The first of these methods has the disadvantage of involving a significant loss of illumination when projecting in slow motion, and an undesirable temporary darkening of the screen during the transformation of the shutter. Although in the second of the above methods, in which a nine-bladed shutter is used throughout, there is no loss of illumination when the frame sequence rate is reduced, this method nevertheless precludes an efficient utilisation of the available illumination.

The present invention is directed to an improved projector of this type which is free from the disadvantages of the prior art, and has advantageous features not possessed by known projectors of this type.

The invention is based upon the principle that it is possible to retain the normal speed of the intermittent mechanism without loss of illumination if, for example, a three-bladed shutter, as usually employed for the projection of narrow gauge film, is allowed to revolve at the normal speed of, say 960 r.p.m. for both the higher and the lower frame sequence rates.

According to one aspect of the present invention, therefore, in a film projector adapted for normal and slow motion projection, means are provided for effecting change-over from one mode of operation to the other by changing the frame sequence rate independently of the shutter speed.

According to another aspect of the invention, a film projector adapted for normal and slow motion projection includes a rotary shutter and drive means therefor, an intermittent mechanism controlled by the drive means whereby to advance the film frame by frame through a gate in synchronism with the shutter, means for controlling the intermittent mechanism whereby to provide two frame sequence rates, and selector means operable to effect change-over from one mode of operation to the other by changing the frame sequence rate without changing the shutter speed or the speed of operation of the intermittent mechanism.

In this way, a change in the frame sequence rate does not involve a change in the speed of the drive means of the rotary shutter, nor does it involve a change in the operating speed of the intermittent mechanism whereby the film is actually stepped through the gate, so that the illumination of the picture remains optimal at both normal and slow motion speeds without giving rise to flicker. Moreover, the structural complications involved in the transformation of a three-bladed shutter into a nine-bladed shutter are eliminated, since conventional types of rotary shutter and intermittent mechanisms can be used.

The invention also provides facilities for remote control of the projector by a manual or pedal-operated switch, for automatic control by the film itself, and for fully automatic control by a magnetic tape.

In one construction according to the invention, the film projector may be controlled by electrical pulses generated by manual keys, magnetic tape, or other means, by the operation of relays in such a way that the first pulse starts the projector and each following pulse causes the mode of operation of the projector to be changed.

In order to ensure that the change-over in the mode of operation of the projector takes place in the desired sequence, when control is by magnetic tape, provision may be made for restoring the change-over mechanism to its normal or initial position before a projection begins. For this purpose keys and indicating lamps may be provided.

An electrically controlled projector embodying the invention may be equipped for normal and slow-motion projection in both forward and backward directions, as well as for still projection and for the automatic restoration to normal of the change-over mechanism. In the case of automatic restoration of the change-over mechanism, keys and indicating lamps are not required.

The switching operations required to satisfy the above-mentioned functions comprise:

(1) Starting the projector at normal speed in forward motion;
(2) Changing over from normal to slow-motion and vice versa;
(3) Changing over from forward to backward projection at normal speed and vice versa;
(4) Changing over from normal to slow-motion and vice versa during backward projection;
(5) Changing over from forward or backward projection to still projection of a single frame; and
(6) Automatic restoration of the speed-change mechanism to its normal position.

The invention further provides facilities for reducing the heating effects of the projector lamp when the motor is stationary during change-over between forward and backward projection or during the projection of a still, as well as for the restoration of the speed-change mechanism.

For an understanding of the principles of the invention, reference is made to the following description of typical embodiments thereof as illustrated in the accompanying drawings. In the drawings:

FIGS. 1 and 2 are, respectively, a side elevation view and a front elevation view of one form of projector embodying the invention and including a single-claw intermittent mechanism;

FIG. 1A is a sectional view taken on the line 1—1 of FIG. 1;

FIG. 3 is a side-elevation view of another form of projector change-over mechanism embodying the invention, and including a rocking lever type of claw intermittent mechanism and an eccentric drive;

FIG. 4 is a top plan view corresponding to FIG. 3;

FIG. 4A is a partial elevation view of the film advancing claw driving mechanism, of FIGS. 3 and 4;

FIG. 5 is a detail view illustrating a modification of a clutch-operator included in the mechanism shown in FIGS. 3 and 4;

Figure 6:
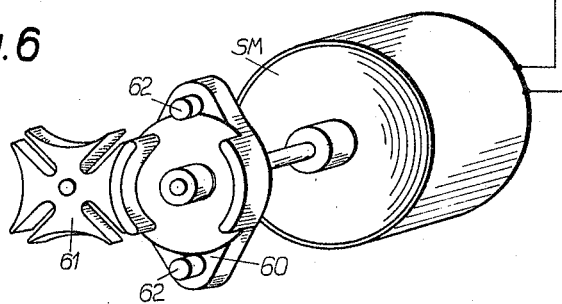
FIG. 6 is a perspective view of the mechanical elements, including a schematic wiring diagram of the electrical connections, of another form of projector embodying the invention and in which the projector is driven by a stepping motor.
Figure 8:
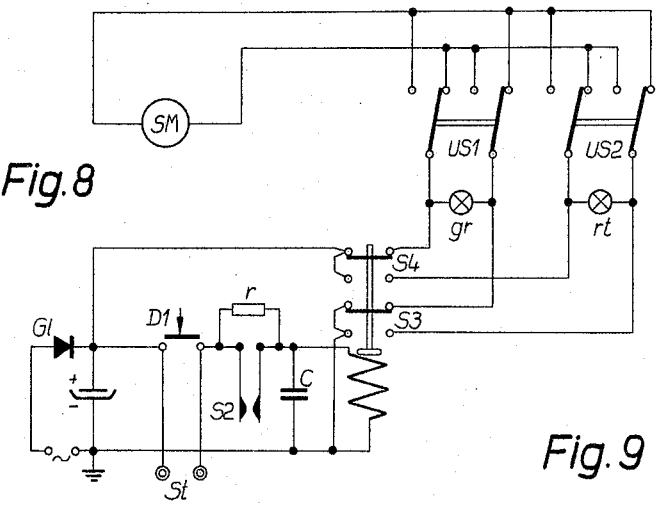
Figure 9:
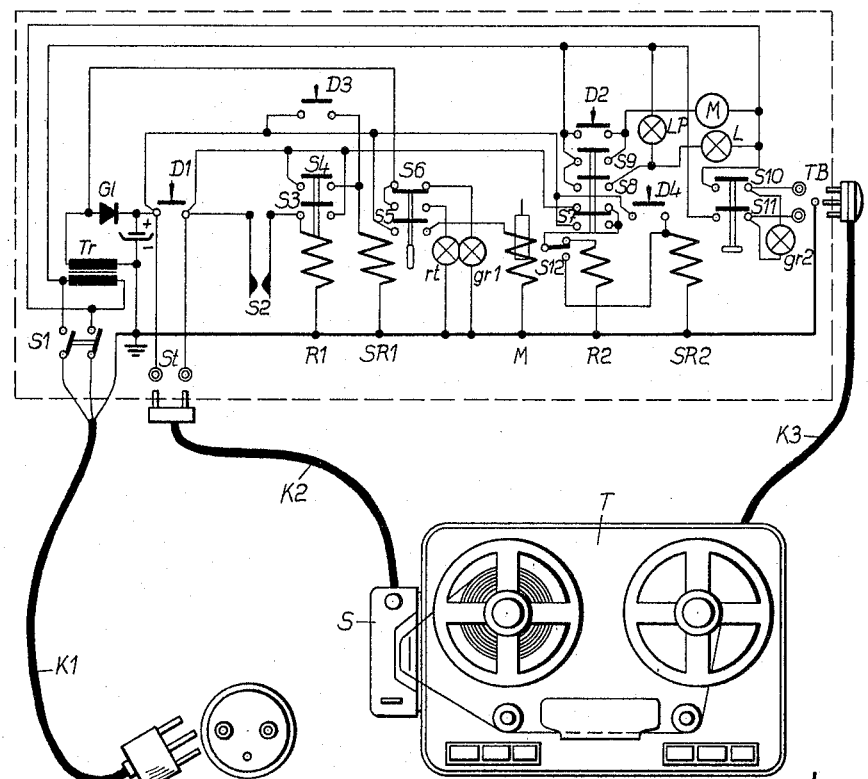
Figure 10:
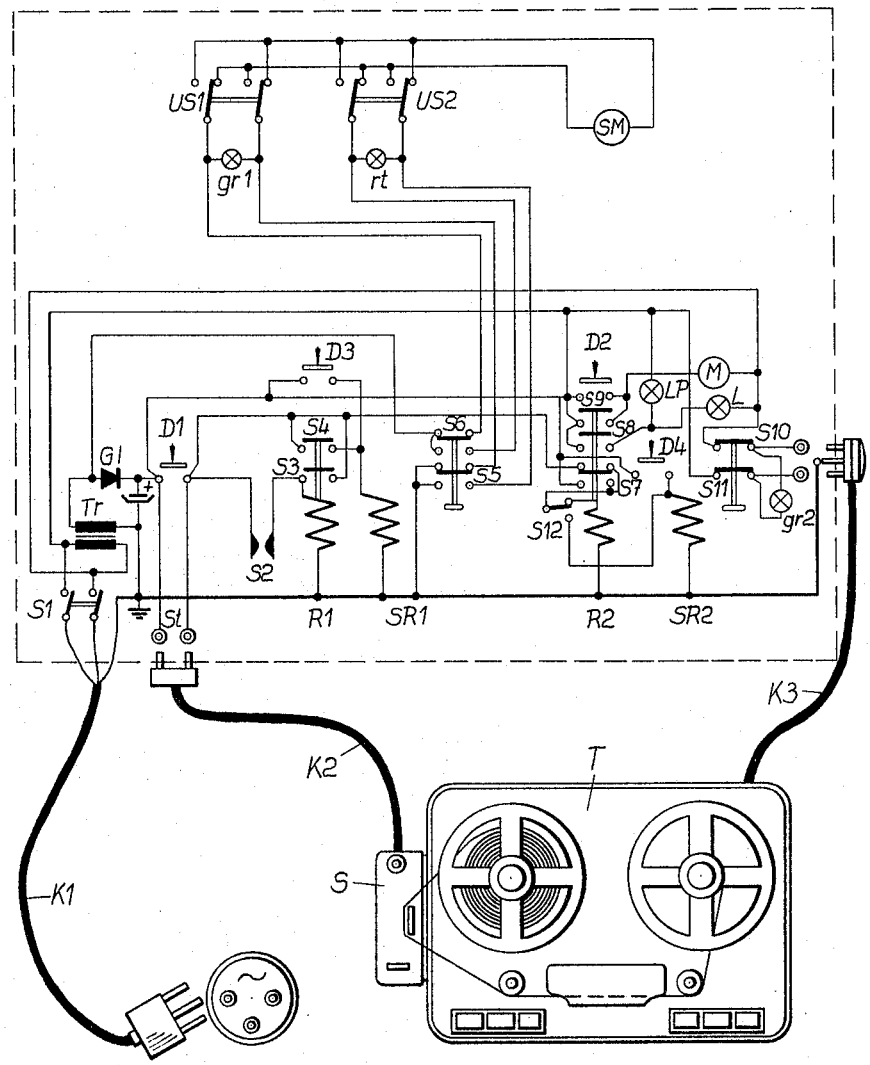
Figure 11:
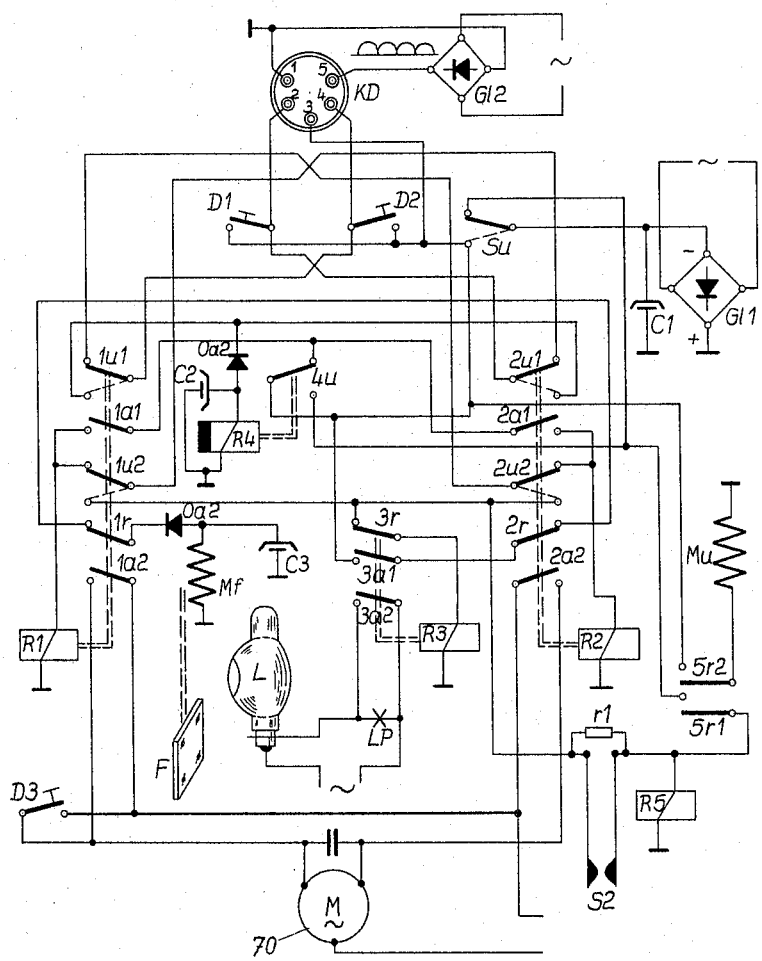
Figure 12:
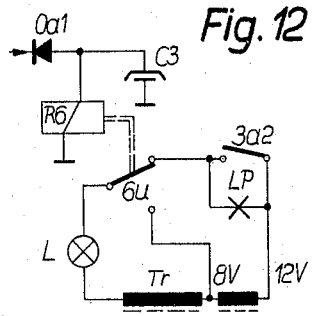
Figure 13:
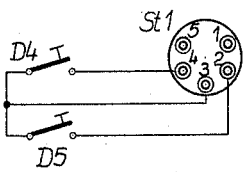
Figure 14:
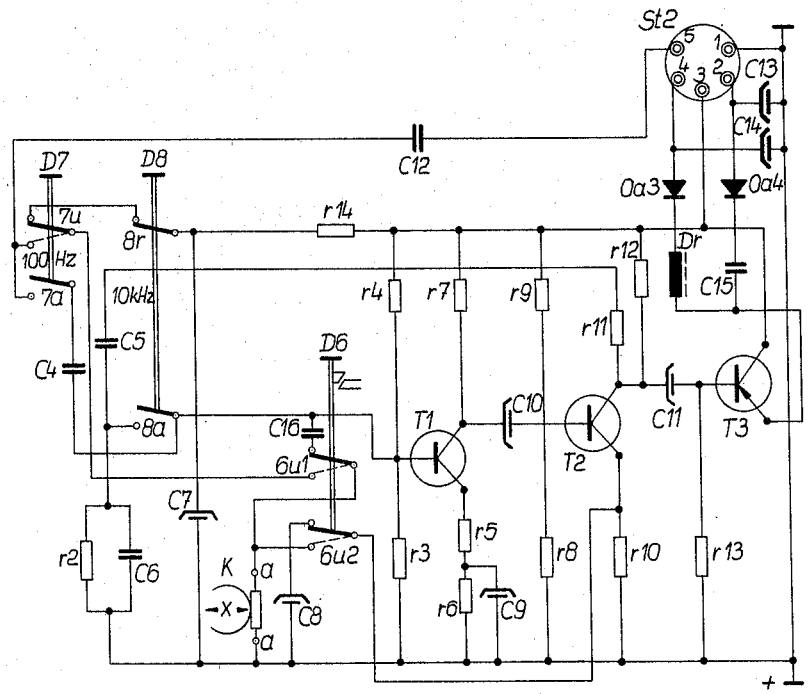

1 and 2 or that shown in FIGS. 3 and 4, and including a manual or pedal-operated control;

FIG. 8 is a schematic wiring diagram of a control circuit for use with the projector shown in FIG. 6;

FIG. 9 is a part-schematic wiring diagram and a part-plan view of a control-circuit for a fully-automatic control of the projector shown in FIGS. 1 through 4 by means of a magnetic tape recorder;

FIG. 10 is a view, similar to FIG. 9, of a magnetic recorder automatic control for the projector shown in FIG. 6;

FIG. 11 is a schematic wiring diagram of an illustrative relay-operated system for forward and backward projection at normal speed or in slow motion, as well as for the projection of a still, all in accordance with the invention;

FIG. 12 is a partial schematic wiring diagram illustrating a modification in which the thermal radiation of the projector bulb is reduced by lowering the voltage applied to the projector lamp;

FIG. 13 is a partial schematic wiring diagram illustrating an arrangement involving a cable for remote control by the use of two manual switches; and FIG. 14 is a schematic wiring diagram of a pulse generator for generating two pulses at respective different frequencies.

FIGURES 1 and 2 illustrate a change-over mechanism of a projector which comprises a simple intermittent claw movement, but it should be understood that other types of claw movement could be used. The entire intermittent mechanism which, in the illustrated embodiment constitutes a separate structural unit, together with all associated parts, is mounted on a common base plate 1 and is arranged to be driven from a shaft 2, through a pinion 3 and a gear wheel 4, together with the three-bladed shutter 127 in a manner well known to the art. The pinion 3 meshes with an intermediate wheel 5 and, through a gear wheel 6, drives a sprocket drum 7 which is mounted on the same shaft 8 as gear 6, and feeds the film 113 in the conventional way. The two shafts 2 and 8 run in stationary bearings between the baseplate 1 and a fixed plate 9, whereas the shaft of the gear wheel 5 is mounted on a lever 10 which pivots on the shaft 8. Lever 10, which is biased by a spring 13 into the position shown in the drawing, also carries gear wheels 11 and 12. When lever 10 is tilted about its pivot by a solenoid M, which is operated in a manner that will be later described in connection with the associated circuit diagrams, gear wheel train 3, 11, 12 and 6 will be operative, instead of the gear wheel train 3, 5 and 6. Accordingly the feed speed of the film 113 will be reduced, for example, in the ratio of 3:1.

The driving gear wheel 4 which, together with pinion 3 is fast on shaft 2, remains continuously in mesh with a gear wheel 14 mounted on a plate 18 and fixedly connected to a gear wheel 15 and an eccentric 16. The claw 17 is actuated in conventional manner by eccentric 16 to advance the film 113 past film window W. Plate 18 is pivotally mounted on shaft 2 but, in its normal position, it is retained by a catch 19 against the pull of a tension spring 20. Plate 18 also carries a gear wheel 21 meshing with gear wheel 15 and carrying a cam 22.

If the change-speed gear train is tilted by solenoid M to the required position for slow-motion projection, as above described, a rod 23 simultaneously releases catch 19. Cam 22 then will be urged by spring 20 into contact with a roller 24, which is rotatably mounted on the baseplate 1, causing the plate 18 to be oscillated a few millimeters to the right and to the left. Claw 17, which is likewise mounted on plate 18, participates in this oscillating motion and the points 26 of the claw, assuming a transmission ratio between the wheels 15 and 21 of 1:3, will thus engage the perforations of the film 113 only at every third, instead of at each, forward stroke of the reciprocating claw. The number of frames per second is thus reduced in the proportion of 3:1. Since claw 17 actually reciprocates the same number of times as before, its speed of actuation, and therefore the speed of stepping the film from frame to frame, remain the same although the number of frames advanced per second is reduced. If the intermittent claw movement includes an idle motion, the points of the claw 17 will advance the film 113 to the next frame only once in six or nine claw reciprocations for slow-motion projection. The object of the contacts S2 on the baseplate 1 is to ensure that the change-over to a different speed can taken place only at the appropriate instant, and that the film cannot be damaged by the points 26 of the claw.

FIGURES 3 and 4 illustrate another embodiment which comprises a rocking claw driven by an axial cylinder cam. Fast on a shaft 27, which can be driven by a motor through a pulley 28, are a bladed shutter disc 29 with an eccentric 30, a cylinder cam 31 intermittently moving the claw 48 into engagement with the perforation in a film 49 and a gear wheel 32. Claw 48, as best seen in FIG. 4, is reciprocated to and fro in the direction of film movement by cam 30, and has a pin or the like 48a engaged with cylinder cam 31 whereby claw 48 is intermittently engaged with the perforations in film 49. A worm 34 drives a worm wheel 35 which is fast on a shaft 51 carrying the film driving sprocket 50. However, in contradistinction to film projectors of conventional kind, worm 34 is not fast on shaft 27 but is rotatably mounted thereon. Worm 34 is driven either through gear wheel 36 or through gear wheel 37, both of which are connected to worm 34. A gear wheel 39 and an axial cylinder cam 33 are fast on a second shaft 38. A shift sleeve 40 is rotatably entrained by shaft 38 but can be shifted axially by a shift arm 44 into frictional engagement with either gear 41 or gear 42, each being formed with a friction cone 43. In the normal position illustrated in FIGURE 3 the shift arm 44 is retained by a spring 52 in lodging engagement with a lever 45.

Shaft 27 rotates at a constant speed of, say, 960 r.p.m., so that the speed of shaft 38 will be constant at 320 r.p.m., assuming that the reduction ratio between gears 32 and 39 is 1:3. When gear 41 is entrained by clutch 40, it drives worm 34 at the speed of 960 r.p.m. by virtue of the step-up ratio between gears 41 and 37, so that sprocket drum 50 feeds the film at a rate corresponding to 16 frames per second. The claw 48 is likewise controlled by shaft 27 and advances the film at the required rate of 16 frames per second.

When solenoid M raises shift arm 44, gear 41 is released and instead gear 42 is engaged. Since gears 36 and 42 have the same diameter, worm 34 is now driven at a speed of 320 r.p.m., thus reducing the film feed to one third of its former speed. At the same time the lifted shift arm 44 releases lever 45. Shaft 27 is therefore free to shift axially in its bearings 46 and, consequently, be reciprocated axially, under the bias of spring 47, between positions prescribed by the cooperation of lever 45 and cylinder cam 33. Hence the points 48 of the claw will engage and advance the film by one frame once in every three revolutions of shutter 29. This corresponds to a frame speed of 5⅓ per second.

The contacts S2 serve to prevent damage to the film when the frame sequence rate is changed. It will be readily understood that the change in frame sequence rate could also be effected by a magnetic clutch or, as clearly shown in FIGURE 5, by hand.

FIGURE 6 shows another embodiment in which the intermittent movement is mechanically completely separated from the rest of the mechanism and has the form of a Geneva movement. However, in this arrangement the star wheel 61 could be replaced by a claw movement of any type. Fast on a shaft 63 are a driving wheel 53, a cam 54, a pinion 55 and a three-bladed shutter 56.

Shaft 63 is arranged to be driven by a motor through wheel 53 so that its speed remains constant, at say 960 r.p.m. The gear transmission of 1:3 from pinion 55 to the gear 57 keeps the speed of the shaft 58 constant at 320 r.p.m. Shaft 58 likewise carries a cam 54 and a cam 59. The two cams 54 co-operate with respective two-pole change-over contacts US1 and US2, whereas cam 59 co-operates with one pair of contact blades S2, for controlling the film feed by a stepping motor SM (see FIG. 8). Since the torque of shaft 63 is required only to rotate shutter 56 and to operate contacts US1, US2 and S2, and not to feed the film, the driving motor for wheel 53 may be quite small. As will be explained more fully with respect to FIG. 8, switch S2 controls energization of a relay selectively operable to connect either switch US1 or switch US2 in the energizing circuit of stepping motor SM. These connections are illustrated only somewhat schematically in FIG. 6.

The film is advanced by stepping motor SM, which operates in exactly the same way as the stepping motors used in selectors in telecommunication installations. The entraining wheel 60 which co-operates with star wheel 61 of the Geneva movement can be directly coupled to the stepping motor, or alternatively a claw intermittent motion can be coupled therewith through a gear train. Since stepping motor SM steps twice each time the contact blades US1 or US2 are operated, each step corresponding to a half revolution of its rotor, entraining wheel 60 is conveniently fitted with two projections 62, if the Geneva movement comprises a four lobed star wheel, or it may have three or four projections 62 for a six or eight lobed star wheel. When the pulses from switch US1 are applied to stepping motor SM, as will be explained in detail by reference to FIGURES 8 and 10, the motor will perform a half revolution for each full revolution of shaft 63, so that the film will be advanced 960 times per minute, that is, at the rate of 16 frames per second. On the other hand, if the pulses are derived from switch US2, then motor SM will be pulsed only once for every three revolutions of shaft 63 so that the intermittent mechanism will operate at a rate of 5⅓ frames per second.

A projector in accordance with the invention can be electrically controlled in several ways as follows:

A. For manual control, by means of a push button or key on the projector,
B. For remote control, by means of a button or pedal-operated switch,
C. Automatically by the film itself, or
D. Fully automatically, by a magnetic sound track running in synchronism with the film.

Figure 7:
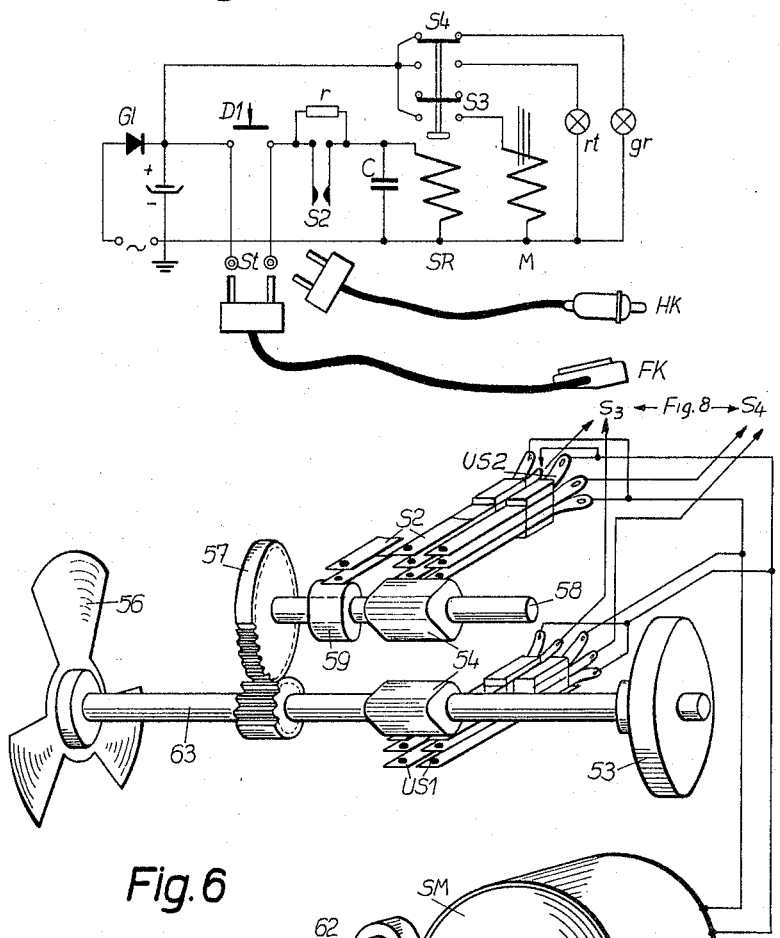
FIG. 7 is a schematic wiring diagram of a control circuit for use either with the projector shown in FIGS.

FIGURE 7 is an illustrative example of electrical control means for a film projector of the kind shown in FIGS. 1 to 4. All the components of the electrical equipment form part of the projector and may be accommodated inside the projector housing. The circuit is shown in its normal starting condition, but the open contacts S2 may initially be closed, as indicated in FIGURES 1, 3 and 4. The D.C. voltage supply for stepping relay SR and solenoid M is derived from a rectifier G1.

When the projector is switched on, a green warning lamp gr glows, indicating that the solenoid is not energized and that the projector is set to operate at its normal speed of 16 frames per second.

Change-over to slow-motion operation can be effected directly by depressing a key D1, or alternatively by remote control through a cable and manual switch HK or a cable with a pedal-operated switch FK, selectively connectable by plug and socket St.

Automatic control can be effected by metallising a section of film alongside the picture frames and passing the metallised portion over a sliding contact SK connected in parallel with the key D1.

As soon as the energising circuit of the stepping relay SR has been completed through either the key D1, socket St or sliding contact SK, solenoid M will be energised and will operate the change-over mechanism illustrated in FIGURE 1 or FIGURE 3. The switching action at relay contacts S4 causes green warning lamp gr to go out and red warning lamp rt to light up. When key D1 is opened, stepping relay SR is de-energized and re-establishes the former condition, causing green lamp gr to light up again. This process can be repeated any number of times until the projection of the film is finished.

FIGURE 9 illustrates the fully automatic control of a motion picture film projector by a magnetic tape recorder T. In this example the electric control is performed entirely by relay means, but electronic control means could alternatively be used. For fully automatic control by magnetic tape, the socket St is connected to a slide changer control unit S of the kind normally used for lantern slide projectors, and a further socket TB of the control circuit is connected to the tape recorder T. the control circuit is provided with a mains supply cable K1 and a mains switch S1. A switch S12, which is controlled by the film is shown in the position it occupies when the film has been drawn through the gate. When there is no film in the gate the switch is in its alternative position and the projector cannot be started until the film has been properly inserted. The fact that the projector is ready for operation is indicated by an interval lamp LP which is in series with the projector lamp L, and by warning lamps gr1 and gr2. If lamp rt lights up instead of the lamp gr1, the lamp gr1 can be made to light and the red lamp rt go out by depressing the key D3. Should the lamp gr2 fail to light up, this indicates that the magnetic tape recorder has no power and must be switched on by depressing a key D4.

As soon as the tape recorder has been started, its further operation is fully automatic, provided the magnetic sound track on the tape has first been synchronised with the film, and the sound track generates the necessary pulses through the control set S. The tape therefore starts to run, beginning for example with an introductory talk, until the first pulse generated by the sound track in the control unit S briefly closes the circuit through relay R2, contacts S12 and S7, and the socket St. Relay R2 is energised, thereby energising the projector lamp L and the projector motor 70, and causing the projector to run and the interval lamp LP to be extinguished by the short-circuiting action of contacts S8. Since relay R2 is held by its holding contacts S7, the projector continues to run until, at the end of the film, switch S12 is again operated.

Not later than at the end of the first revolution of cam 22 shown in FIGURE 2, or of the cylinder cam 33 shown in FIGURE 3, the contacts S2 will close, causing relay R1 to respond. Stepping relay SR1 is therefore energised via contact S4, closing contacts S5 and energising the solenoid, which latter actuates the change-speed mechanism to its slow motion position, as described by reference to FIGURES 1 and 3. In order to prevent energisation of stepping relay SR1 several times during the short contacting period of contacts S2, which is about 20 ms., relay R1 is held by its holding contacts S3 for the duration of the pulse from the magnetic tape. At the same time contacts S6 of stepping relay SR1 will interrupt the circuit containing green warning lamp gr1 and close the circuit of red warning lamp rt. When the first pulse terminates, relays R1 and R2 are deenergised but contacts S5 remain closed until relays R2 and SR1 are operated again by the next pulse, solenoid M being deenergised by the opening of contacts S5 and the projector resuming its normal frame sequence speed. This is indicated by green lamp gr1 lighting up again. The third pulse closes contacts S5 in the same way as before, the fourth pulse re-opening these contacts, and so on until, at the end of the film, relay R2 is deenergised, stopping the projector and causing interval lamp LP to light up. The magnetic tape continues to run until the next pulse operates stepping relay SR2 through switch S12, which has meanwhile changed over, and stops the tape recorder via contacts S10 and S11, lamp gr2 being simultaneously extinguished. The display of the film by the projector is thus terminated.

The electric control of projectors comprising a stepping motor according to FIGURE 6 differs only slightly from the control means described above. A few examples will be described by reference to FIGURES 8 and 10.

As has been explained in connection with FIGURE 6, change-over switches US1 and US2 are operated by cams revolving at different speeds in the ratio of 3:1. Stepping relay SR of FIGURE 8 or SR1 of FIGURE 10 applies potential not to solenoid M as described with reference to FIGURES 7 and 9, but to the two change-over switches US1 and US2. The pulses which thus arrive at longer or shorter intervals control the motion of stepping motor SM and thereby cause the desired change in the number of frames projected per second.

The ratio of 3:1 between the frame speeds for normal and slow motion projection, which has been assumed in the examples described, has proved to be a useful ratio when the normal speed is 16 frames per second. Nevertheless, a different ratio might alternatively be chosen. If the normal speed is 24 frames per second the ratio might well be raised to 5:1.

In the projector control means illustrated in Figure 11 the relays are indicated by R1 to R5. In the reference used for identifying the contacts, the first character relates to the relay with which the contact is associated, whereas the following letter $a$, $r$ or $u$, signifies a working contact, a rest contact, or a change-over contact. The other references are conventional, and require no further explanation. The two relays R1 and R2 each comprise two $a$, one $r$ and two $u$ contacts. They are interlocked and serve primarily for reversing the motor. Relay R3, not only has an $a$ and an $r$ contact, but also has a high current $a$-contact for the low voltage projector lamp. R4 is a delayed releasing relay and comprises one $u$ contact. R5 is a stepping relay with two $r$-contacts.

This projector control system functions as follows:

The controlled relay voltage is supplied by rectifier $Gl1$. When the film is threaded into the projector a switch $Su$ located in the film gate is reversed and makes a connection between rectifier $Gl1$ and the two keys D1 and D2. For convenience of drawing the film into the projector, or in order to permit the film to be threaded into the projector automatically, motor 70 can be started in the forward direction independently of the relays by the depression of key D3. The projection of the film can then be started by depressing key D1, which completes a circuit through relay contacts $2u1$, $1u2$, and relay R1, causing relay R1 to operate. The holding contact $1a1$ holds relay R1, which would otherwise be released because of the change-over in the position of contact $1u2$, via contacts $4u$ and $Su$. Contact $1a2$ switches the motor for forward running and relay R3 operates via contacts $1u2$ and $3r$, switching on the projector lamp L via contact $3u2$. Relay R3 is held via contact $3a1$ until contact $Su$ breaks the circuit at the end of the film. An interval lamp Lp connected across the contact $3a2$ is arranged to light up when projector lamp L is switched off and to go out when the projector lamp is lit. The stepping relay R5 operates via contact $1u2$ and contact S2, which latter is controlled by the projector mainshaft. The value of resistor $r1$ is so determined that relay R5 cannot respond when S2 is open but will hold after having been operated by the closing of contacts S2 for as long as key D1 remains closed. The purpose of contact S2 is to prevent the change-over in frame speed unless the claw movement is in a particular position. A magnet $Mu$ is energised via contacts $5r2$ and $Su$ and shifts the change-speed gearing, which is not shown in this drawing. The magnet $Mu$ remains energised until a second pulse returns contact $5r2$ to its former position through operation of relay R5.

The first switching operation, which takes about 20 ms. to complete, is thus completed and the projector begins to run in slow motion in the forward direction. The second pulse closes the circuit through key D1, and contacts $2u1$, $1u2$, S2 and causes relay R5 to operate, magnet $Mu$ therefore being deenergised, since contacts $5r2$ open again, and shifting the change gearing back to normal speed. The third pulse will then again cause a change to slow-motion operation, and so on. If key D2 is depressed instead of key D1, the completion of the circuit through contacts $1u1$, $oa2$ will cause relay R4 to become energised, and contact $4u$ to interrupt the energising circuit of relay R1, which will therefore drop out. Although the release of contact $1u2$ will simultaneously break the energising circuit of relay R4, release of the latter is delayed by rectifier $oa2$ and capacitor C2. The deenergisation of relay R1 stops the motor 70. At the same time potential will be applied to contact $5r1$ through contact $4u$, so that, if contact $5r1$ were closed at this instant and the projector were operating in slow motion, relay R5 would operate and automatically restore the normal position. At the end of its period of delay, relay R4 is released and, assuming that key D2 is kept depressed for a longer period than corresponds to the period of delay, closes the circuit D2, $1u1$, $2u2$, relay R2, thereby operating relay R2. Projector motor 70 is thus switched to reverse by $2a2$.

The subsequent events controlled by relay R2 proceed in exactly the same way as in forward running under the control of relay R1, so that backward projection begins in slow motion and any following operation of switch D2 will change over the mode of operation of the projector from slow motion to normal speed and vice versa. In order to change back to forward projection, all that is required is the renewed operation of switch D1, causing relay R4 to operate, relay R2 to be deenergised by $4u$, and relay R1 to be re-energised at the end of the period of delay, with the consequent reversal of the direction of rotation of motor 70 to forward running, and so on, as already described above. If while the projector motor is running switch D1 or D2 should be kept depressed for a shorter period than the delay time of relay R4, then motor 70 will stop without being reversed. Since projector lamp L remains lit until the film is exhausted, it is thus possible to interrupt the projection.

Immediately after the still projection of a frame the projector can be started again in forward or reverse motion by the depression of the appropriate key or switch D1 or D2.

In order to prevent the film from becoming too hot when projecting a frame as a still, or during the period of change-over from forward to reverse operation, a protective filter F is provided which is inserted by a solenoid $Mf$ into the light path of the projector lamp when the motor is stopped while the lamp remains lit, that is to say, only if both relays R1 and R2 are released and relay R3 is in its operative position, because in such a case the circuit of solenoid $Mf$ will be closed through contacts $oa1$, $1r$, $2r$, $3a1$ and $Su$. The deenergisation of solenoid $Mf$ is delayed by rectifier $oa1$ and capacitor C3 to prevent filter F from being withdrawn too quickly when the motor is started again.

Instead of providing a heat absorbing filter F operated by a solenoid $Mf$, a relay R6 may be arranged to reduce the voltage applied to the lamp (FIGURE 12). Furthermore, instead of the two control keys D1 and D2, a cable fitted with two control keys D4 and D5 (FIG. 13) may be connected to the system by plug $St1$ and socket $Kd$ (FIGURE 11) for the purpose of remote control.

The control through relays by two pulses, an arrangement which can be used also for other systems, is particularly important because it is the only type of arrangement permitting a useful and relatively simple control by a magnetic sound track. Two possibilities are available, in accordance with the invention, for achieving two-pulse control by magnetic tape, namely either the provision of a two-frequency pulse generator and a single sound track, with the frequencies being separated during reproduction by a frequency filter, or the provision of a single frequency pulse generator in association with a twin sound track and two-pulse amplifying channels.

A simple and inexpensive type of two-frequency pulse generator is illustrated in FIGURE 14. In this network two widely separated frequencies are employed, say 100 c./s. and 10 kc./s., to permit the frequency filter to be of simple form. Naturally any other frequencies which may be suitable for magnetic tape recording could be chosen. The 100 c./s. frequency is supplied by a rectifier bridge $Gl2$ (FIGURE 11), whereas the 10 kc./s. frequency may be supplied by a conventional RC oscillator network comprising two transistors T1 and T2, in which the frequency is determined by the two RC elements $r2/C6$ and $R11/C5$. During reproduction, transistors T1 and T2 are connected to function as amplifiers by the operation of key D6, transistor T3 functioning as the output amplifier.

If the push button switch D6, which is shown in the drawing in its appropriate position for play-back, is depressed into position for recording, a circuit will be completed from sound head K, through $6u1$, $7u$, $8r$, $r14$ via plug $St2$–3, socket $Kd$–3 (FIGURE 11) and $Su$, connecting sound head K to the erasing voltage, which latter is limited by resistor $r14$. Operation of switch D8 cuts off the erasing voltage by opening contact $8r$ and at the same time, at $8a$, completes the oscillating circuit $r2/C6$–$r11/C5$, T1 and T2, the 10 kc./s. frequency being tapped at $T2/r10$ and taken to the sound head K via contact $6u2$ and recorded on the magnetic tape. At the same time the oscillator frequency is amplified by transistor T3 and condenser C15 and rectifier $oa4/C13$ and reaches key D1 through $St2$–2 and $Kd$–2 (FIGURE 11), to perform all the functions of the former key D1, including the starting of the projector by operating relay R1, changing the frame speed and so on.

Operation of switch D7 interrupts the erasing voltage at contact $7u$, whereas contact $7a$ closes the circuit K, $6u1$, $7u$, C12 via $St2$–5 and $Kd$–5 (FIGURE 11), $Gl2$, thus applying the 100 c./s. voltage supplied by $Gl2$ to the sound head K. This 100 c./s. frequency reaches key D2 via $7a$, C4, T1, T2, and T3, the reactance $Dr$ of the frequency filter, $oa3$, $St2$–4, $Kd$–4 (FIGURE 11), and performs all the functions of key D2. If key D6 is returned to play-back position, the 100 c./s. and 10 kc./s. pulses recorded on the magnetic tape will be amplified via contact $6u1$ and capacitor C16 by transistors T1 and T2 and then reach the frequency filter $Dr/C15$, where the 100 c./s. frequency pulse is blocked by the small capacitor C15 and can pass only through reactance $Dr$, whereas the 10 c./s. frequency is passed by capacitor C15 since reactance $Dr$ represents a considerable impedance to this frequency.

Since only one track is needed for both control frequencies, the described arrangement provides a fully automatic control, by the magnetic tape, and simultaneous sound reproduction which is not interrupted during backward or still projection. The control assemblies, relays (FIGURE 11) and pulse generator (FIGURE 14) which are separately shown in the drawings may be readily combined and accommodated in the projector housing. This has the advantage that the sound head can be dispensed with in stereophonic tape recorders, only the two sound head connections $a$—$a$ being connected to the input terminals for recording and to the output terminals of the tape recorder for play-back. In single track tape recorders the sound head would then be mounted as an accessory.

While specific embodiments of the invention have been shown and described in detail to illustrate the application of the inventive principles, it will be understood that the invention may be embodied otherwise without departing from such principles.

What is claimed is:

1. A film projector, operable at normal projection speed or at slow motion speed, comprising, in combination, a first shaft; driving means rotating said first shaft at a first substantially constant speed; a second shaft; means drivingly interconnecting said first and second shafts for rotation of said second shaft by said first shaft at a second substantially constant speed differing from and having a fixed ratio to said first constant speed, whereby said first and second shafts are in angular coincidence once during each number of revolutions of said first shaft equal to said ratio; a shutter fixedly interconnected to said first shaft for constant operation in synchronism therewith at said first substantially constant speed; intermittent film advancing mechanism operable to advance the film, and selectively controlled, as to speed of film advance, by either said first shaft or said second shaft; selector means selectively operable to shift the control of said film advancing means between said first shaft and said second shaft; electrically operable means effective, when energized, to operate said selector means to shift control of said film advancing mechanism from said second shaft to said first shaft; an energizing circuit for said electrically operable means; a control circuit for said energizing circuit including a normally open switch means controlling said energizing circuit; and cam means fixed to said second shaft and closing said normally open switch means once during each revolution of said second shaft, when said first and second shafts are in such angular coincidence.

2. A film projector, as claimed in claim 1, including film take-up means; and change-speed gearing, coupling said film take-up means to said driving means; said change-speed gearing being operable by said selector means to effect film take-up at a rate proportional to the selected frame sequence rate.

3. A film projector, as claimed in claim 1, in which said intermittent film advancing mechanism comprises a claw mechanism including a reciprocating claw driven by a cam secured to said first shaft.

4. A film projector, as claimed in claim 3, including a second cam on said second shaft controlled by said selector means; and interlock means actuated by said second cam and operable on said claw to disengage said claw from the film at a predetermined point during the stroke of the claw.

5. A film projector, as claimed in claim 1, including a stepping motor, driving said intermittent film advancing mechanism; and a pair of switches, each operated by a respective cam on said second shaft, and selectively connected into said energizing circuit by said selector means to be operable to supply energizing pulses to said stepping motor in accordance with the selected frame sequence rate.

6. A film projector, as claimed in claim 1, in which said selector means includes electro-magnetic means, including said normally open switch means, and means operable to supply electrical control pulses to said electro-magnetic means.

7. A film projector, as claimed in claim 6, including contact means adapted for operation by the film; said contact means, when operated by the film, initiating said electrical control pulses.

8. A film projector, as claimed in claim 7, in which said electro-magnetic means starts the projector responsive to receipt of the first pulse and effects change-over from one frame sequence rate to the other frame sequence rate upon receipt of each subsequent pulse.

9. A film projector, as claimed in claim 6, in which said driving means is effective to operate said projector to drive the film in either a forward or a reverse direction; means operable to condition said driving means to operate said projector selectively in either the forward direction or reverse direction; and means operable to supply, to said last-named means, either of two different control pulses, one control pulse effecting forward operation of said projector and the other control pulse effecting reverse operation of said projector.

10. A film projector, as claimed in claim 9, in which the means operable to supply said two different control pulses comprises a magnetic tape having a single sound track; a pulse generator operable to generate two pulses at respective different frequencies; a pulse amplifier connected to said pulse generator; and a filter connected to said pulse amplifier to select said different control pulses from said two frequencies.

11. A film projector, as claimed in claim 9, in which said means for supplying said two different control pulses, comprises a magnetic tape having two sound tracks; a single-frequency pulse generator operatively associated with both sound tracks; and two pulse amplifiers each as operatively associated with said pulse generator and with a respective one of said two sound tracks.

12. A film projector, as claimed in claim 9, including a heat filter interposable between the film and the projector lamp; and means operable, responsive to change-over from one frame sequence rate to the other frame sequence rate to move said heat filter to a position between the film and the projector lamp during the change-over period.

13. A film projector, as claimed in claim 9, including a projector lamp; a source of potential for said lamp; and means operable, responsive to changing-over from one frame-sequence rate to the frame-sequence rate, and during the period of change-over, to reduce the voltage supplied from said source to said projector lamp.

14. A film projector, as claimed in claim 1, including means operable automatically to stop the projector at the end of the film; said last-named means automatically restoring the projector, through said selector means, for operation at normal projection speed.

15. A film projector, as claimed in claim 1, including electric circuit means for stopping the projector; and contact means co-operable with the film to energize said electric circuit means when the end of the film is reached.

16. A film projector, as claimed in claim 1, in which said shutter is a rotary shutter.

References Cited by the Examiner

UNITED STATES PATENTS

| | | | |
|---|---|---|---|
| 2,173,230 | 9/1939 | Kellogg | 352—194 X |
| 2,390,389 | 12/1945 | Redler | 352—180 |
| 3,168,743 | 2/1965 | Nesson | 352—180 |

JULIA E. COINER, *Primary Examiner.*